United States Patent Office 3,536,338
Patented Oct. 27, 1970

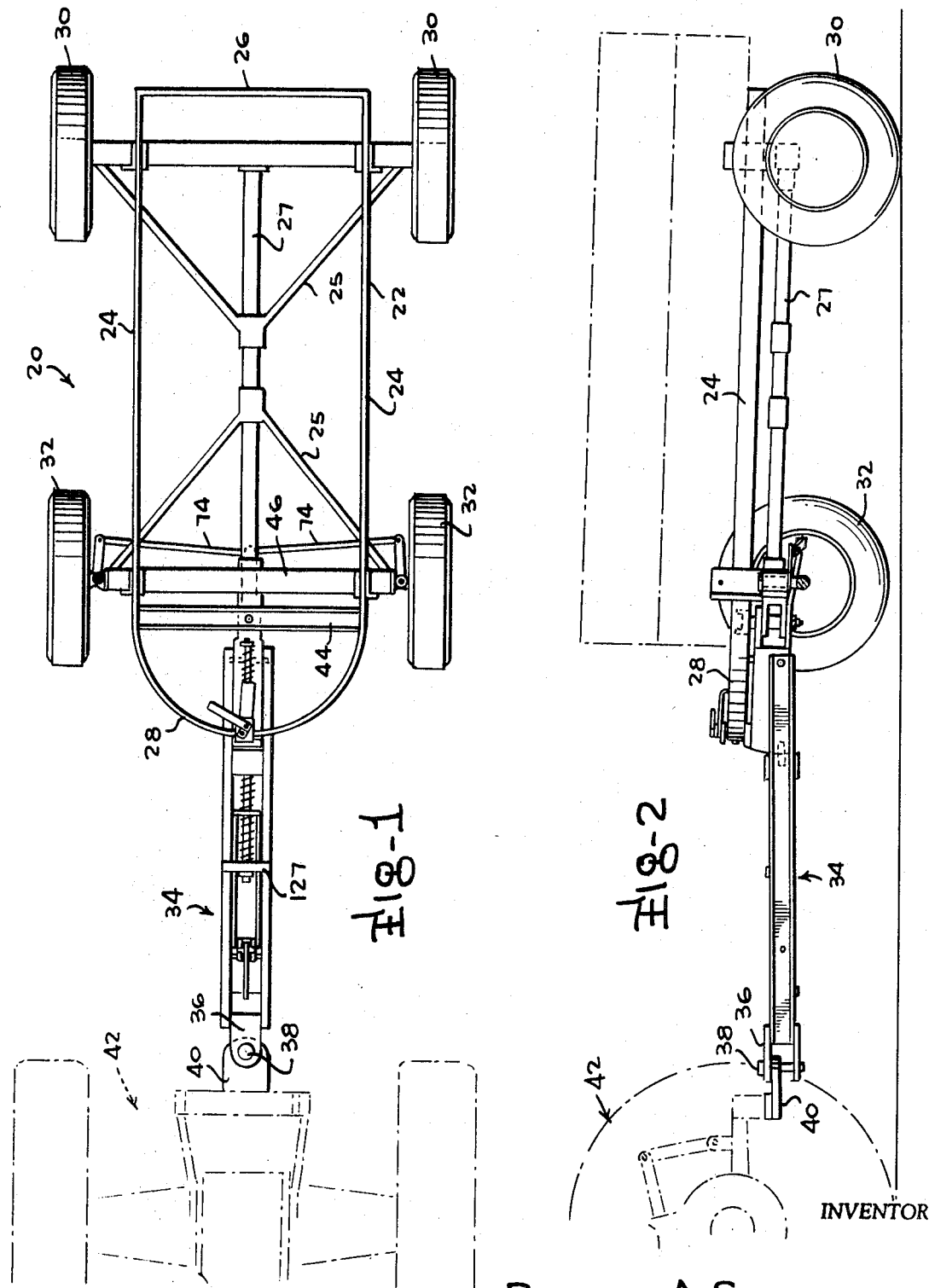

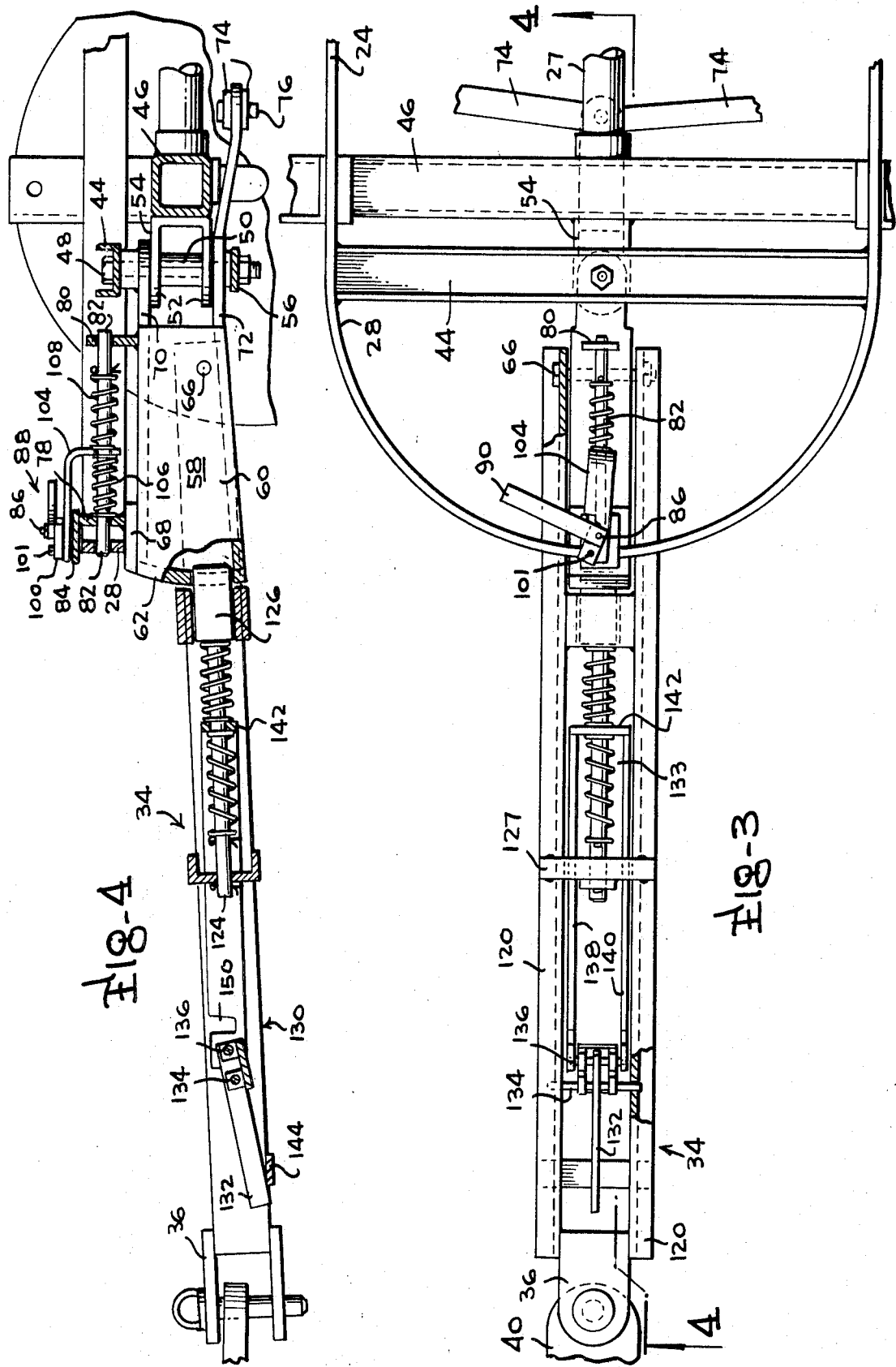

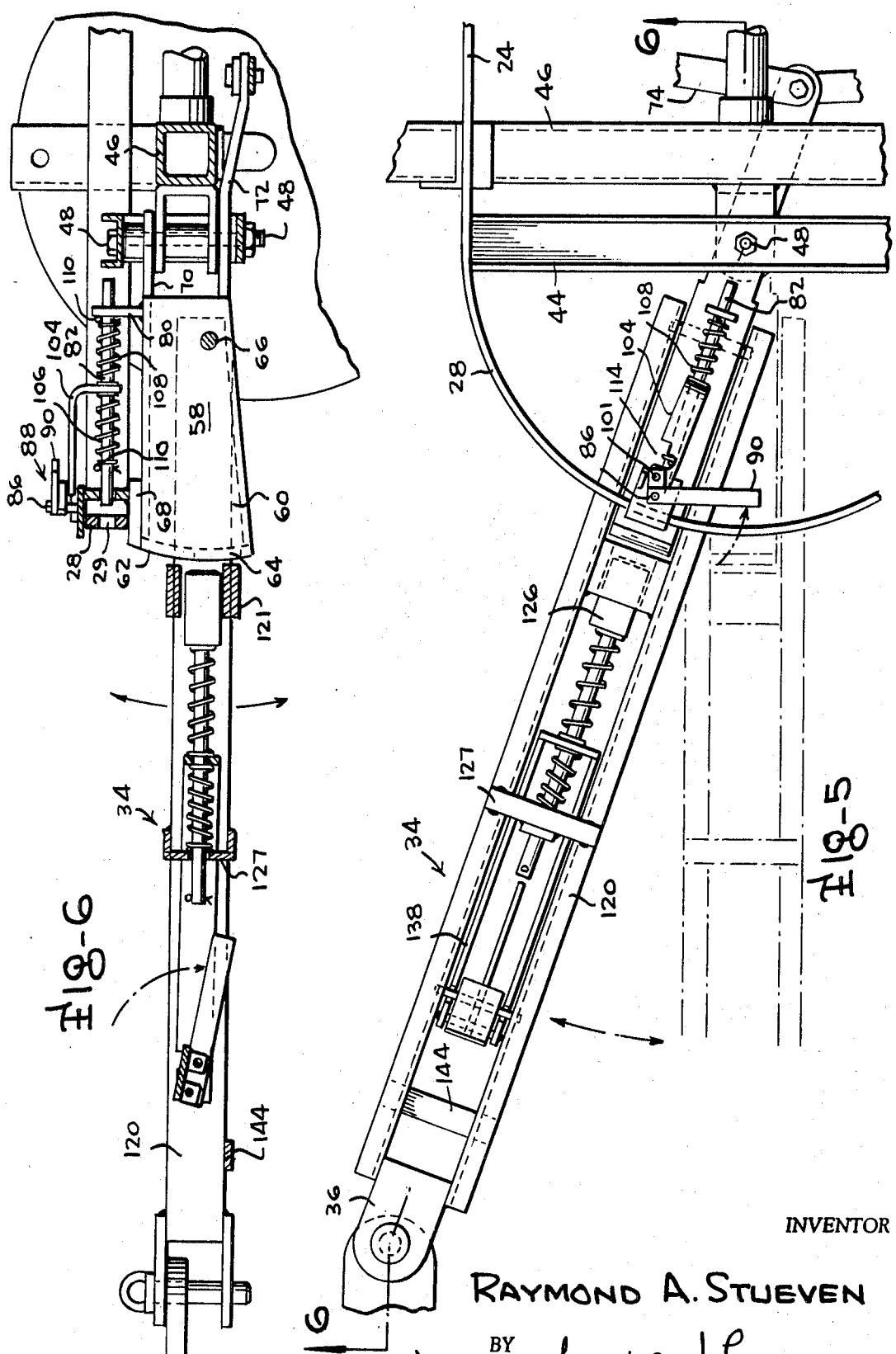

3,536,338
CONVERTIBLE CART-WAGON
LAND VEHICLE
Raymond A. Stueven, Rte. 2, Box 137,
Pipestone, Minn. 56164
Filed June 26, 1968, Ser. No. 740,272
Int. Cl. B60d 1/00; B62d 13/04
U.S. Cl. 280—402                              7 Claims

ABSTRACT OF THE DISCLOSURE

A convertible cart-wagon land vehicle having a draw tongue about a horizontal pivot on a turning block which is pivotable about a frame-mounted pivotal turning block with an arcuate forwardly extending frame portion having a spring biased latch pin receiving recess for latching the turning block in a fixed position and with an opening in the turning block receiving a latching pin for latching the draw tongue in a forward end depressed manner so that lifting of the forward end enables cart-like operation of the vehicle when the turning block is latched and with unlatching of the tongue and turning block enabling four-wheeled wagon-type operation of the vehicle.

BACKGROUND OF THE INVENTION

This invention is related to the field of land vehicles and is particularly related to a wheeled vehicle convertible from a four-wheeled wagon type operation to a two-wheeled cart type operation.

A number of previously known devices have recognized the desirability of providing a wagon-type vehicle which could be converted to two-wheeled operations. The primary advantage of two-wheeled operation is that the vehicle is more maneuverable and supplies additional weight on the driving wheels of the tractor or other towing means towing the vehicle. Undue complexity and cost have characterized the previously known devices of this sort and none of the previously known devices have provided a simple, easy to operate, yet reliable, convertible wagon-cart vehicle.

For example, U.S. Pat. No. 1,983,433, discloses a dump wagon of heavy construction which requires a time consuming complete removal of the front wheels in order to obtain a cart-type mode of operation.

Similarly, U.S. Pat. No. 2,718,410 discloses a complicated and costly hydraulically actuated device for lifting the front wheels of a self-loading scraper device. While devices of this sort are satisfactory for heavy duty equipment of this nature, such devices obviously are too sophisticated and do not provide satisfactory means for use in smaller vehicles such as farm wagons and the like.

Similarly, U.S. Pat. No. 1,887,118 discloses another complicated and expensive device for converting an over-the-road trailer into different modes of operation.

Other devices for providing convertible modes of operation are illustrated in U.S. Pat. No. 2,266,913 and 2,461,577. All of the previously known devices have been inordinantly complicated and consequently expensive to construct and maintain. Therefore, the prior art devices have failed to provide a simple and relatively economical, yet reliable, wagon-cart for farm or other relatively light operations.

SUMMARY OF THE INVENTION

Therefore, it is the primary object of this invention to provide a new and improved land vehicle which can be easily converted from a four-wheeled mode of wagon type operation to a two-wheeled mode or cart type operation.

Obtainment of the object of this invention is enabled by the provision of a vehicle consisting of a main frame member having a pair of rear wheels and a pair of steerable forward wheels. A pivotable steering block is connected to the forward wheels and to a forwardly extending tongue for steering the vehicle when the vehicle is being used as a four-wheeled wagon. In normal operation, the forward end of the tongue is connected to a tractor or other suitable towing means. A horizontal pivot on the turning block enables up and down movement of the front end of the tongue during four-wheeled operation of the device; however, when it is desired to use the device in a two-wheeled mode or cart type operation, latch means is provided on the turning block for latching the tongue in a position so that the forward end of the tongue is depressed. Consequently, lifting of the forward end of the tongue for connection to the draw bar of the towing tractor results in a lifting of the front wheels of the device from engagement with the ground. Moreover, a second latch means is provided for latching the tongue and turning block in axially aligned engagement with the frame of the vehicle so as to enable steering of the vehicle when the device is being used as a cart. The latching means for latching the tongue in axially aligned position consists of a latch pin mounted for reciprocation on the turning block adjacent an arcuate forwardly extending portion of the vehicle frame. An opening is provided in the arcuate portion of the vehicle frame and a floating spring connection between an over-center eccentric link connected to the latch pin enables insertion of the latch pin into the opening in the arcuate frame portion when the opening and the pin are moved into aligned position. however, actuation of the over-center linkage means can occur prior to such alignment with the floating spring connection merely resulting in biasing force against the pin which remains applied until the pin is aligned with the opening at which time the pin as automatically inserted into the opening.

Similarly, the latching means associated with the tongue for latching the forward end of the tongue in a depressed position also includes a floating spring coupled to an over-center linkage means for biasing a tongue latching pin into a latching opening in the turning block. This system functions in the same manner as the previously discussed latching means in that the over-center linkage means can be actuated without actual alignment of the pin and opening without any latching actually occurring until the parts are subsequently aligned for the pin to enter the opening in the turning block.

DESCRIPTION OF THE DRAWINGS

FIG. 1 is a top plan view of the preferred embodiment of the invention;

FIG. 2 is a side elevational view of the preferred embodiment of the invention being operated in a cart-type mode of operation;

FIG. 3 is a top plan view of the tongue and associated latching means of the preferred embodiment illustrating the tongue and turning block in a latched condition;

FIG. 4 is a sectional view taken along lines 4—4 of FIG. 3;

FIG. 5 is a top plan view of the forward end of the preferred embodiment illustrating the turning block and tongue in an unlatched condition; and FIG. 6 is a sectional view taken along lines 6—6 of FIG. 5.

DESCRIPTION OF THE PREFERRED EMBODIMENT

Attention is invited to FIG. 1 of the drawings which illustrates the primary components of the preferred embodiment of this invention. The preferred embodiment comprises a land vehicle generally designated 20 having a main frame 22 consisting of a pair of longitudinal side frame members 24, a rear frame member 26, a forwardly extending arcuate frame member 28 having a latching opening 29 provided in the center of arcuate portion 28. The frame also includes diagonal and axial frame members 25 and 27 respectively as shown in FIG. 1. A rear wheel assembly employing a pair of rear wheels 30 is connected adjacent rearmost portion of frame 22 and front wheel assembly having a pair of steerable front wheels 32 is connected adjacent the forward portion of the frame. A tongue 34 extends forwardly from the wagon and terminates in a forward clevis 36 connected by a pin 38 to the tow or draw bar 40 of a tractor or other suitable towing means 42.

A lateral frame member 44 extends across the frame immediately adjacent the rearmost portion of the arcuate portion 28 as shown in FIG. 1. Similarly, a tubular frame member 46 extends between the front wheels 32 and provides a pivotable support for the front wheels to enable steering of the vehicle during four-wheeled operation. A vertical bearing consisting of a vertical pin 48 extends downwardly from lateral frame member 44 through a sleeve 50 connecting the arm 52 of a U-shaped bracket 54 extending forwardly from the tubular frame member 46 as shown in FIG. 4 of the drawings. The pin 48 is retained in position by a washer and nut assembly 56 on the lower end of the pin. A hollow turning block 58 is pivotally supported by pin 48 for pivotal movement about the vertical axis of pin 48. Turning block 58 comprises a main body portion 60 of arcuate forward configuration at its forward end 62 and having a hollow interior. The curved arcuate surface 62 is provided with a tongue latching hole 64 (FIG. 6) the purpose of which will become apparent hereinafter. Moreover, turning block 58 is also provided with a horizontal shaft 66 mounted near the rear of the turning block which provides a horizontal pivot bearing for the tongue 34 which is pivoted to shaft 66 adjacent the rear end of the tongue as shown in FIGS. 4 and 6. It should also be noted that the top surface of turning block 58 is provided with a pillow plate 68 adjacent the forward end of the turning block immediately beneath and in sliding contact with the arcuate frame portion 28. The rear portion of turning block 58 comprises a pair of longitudinally extending plates 70 and 72 which are pivoted on pin 48 for pivotal movement about the vertical aixs of the pin as illustrated in FIG. 4. The lowermost plate 72 extends rearwardly beneath tubular frame member 46 and is connected to a pair of tie rods 74 by means of a pin 76. Consequently, turning movement of the tongue 34 results in turning movement of the turning block 58 which consequently moves tie rods 74 to steeringly turn front wheels 32.

First and second apertured vertical plates 78 and 80 (FIG. 4) respectively extend upwardly from pillow block 68 and the rearmost portion of the upper surface of the turning block 58 for reciprocatingly supporting a turning block latching pin 82. A horizontal plate 84 is connected to the forward or first vertical plate 78 and has an upwardly extending vertical pivot pin 86 extending upwardly from its upper surface as shown in FIG. 4. Vertical pivot pin 86 provides a pivotal support for over-center linkage means 88 which includes an elongated handle portion 90 connected to a laterally extending link 100 of shorter length than the handle portion. The outer end of the laterally extending link 100 is connected by a pin 101 to a movable plate 104 on one end of plate 104 with the other end or vertical portion of plate 104 being apertured to embrace the turning block latching pin 82 adjacent a central portion thereof as shown in FIG. 4. A floating spring coupling means consisting of springs 106 and 108 which are biased against opposite sides of plate 104 and against retaining washers 110 which are retained in position by cotter keys extending through pin 82 enables reciprocable movement of turning block latching pin 82 by means of plate 104 in a manner to be discussed hereinafter in greater detail.

It should be noted that the aperture 29 of arcuate portion 28 of the frame can receive the turning block latching pin 82 for latching the turning block in an axially aligned position with respect to the axis of the wagon and wagon frame. FIG. 4 illustrates pin 82 in a latched condition extending through opening 29 and FIG. 6 illustrates pin 82 in an unlatched condition retracted from opening 29.

Turning now to FIGS. 3 and 5, the manner in which the over-center linkage means positions the pin will be discussed in detail. It should be noted that plate 104 is provided with a cut out or recess 114 closely adjacent the point at which plate 104 is connected to the outer end of the laterally extending link 100 by pin 101. Positioning of the elongated handle portion 90 in the position illustrated in FIG. 3 moves plate 104 to the left as illustrated in FIG. 3 and moves pin 101 to an over-center position with respect to the axis of pin 82 so that the pressure of spring 106 against plate 104 tends to rotate link 100 in a clockwise direction as shown in FIG. 3. However, the opening 114 in link 100 engages pin 86 to limit the amount of movement possible so that the parts remain in the position shown in FIG. 3. Consequently, pin 82 will remain in latched condition as shown in FIG. 4 so that horizontal movement of the tongue would result in pivotal movement of the entire vehicle about the center of the rear wheel axis rather than merely a turning movement of wheels 32.

Unlatching of turning block 58 from the latched condition of FIG. 3 is easily obtained by moving the elongated handle portion 90 in a counter clockwise direction from the FIG. 3 position to the FIG. 5 position in the direction indicated by the arrow of FIG. 5. Movement from the FIG. 3 position to the FIG. 5 position swings pin 101 around to the position illustrated in FIG. 5 so that the plate 104 is moved to the right and spring 108 will consequently move pin 82 to the right to move the pin from engagement within the confines of opening 29 to unlatch the turning block.

Tongue 34 comprises a pair of laterally spaced outside frame members 120 connected at their forward end by clevis 36 and at their rearmost end by horizontal shaft 66. Frame members 120 are also connected by heavy lateral pin supporting plates 121 which support the rearward end 126 of a tongue latching pin 124. A central transversely extending frame member 127 extends across an interior space between outside members 120 as shown in FIG. 3. Member 127 is welded to the outside frame members or fastened in any other convenient manner and is provided with an aperture through which the forward end of tongue latching pin 124 is slidably received. The rearward end 126 of the tongue latching pin 124 is in the form of a rectangular latch lug 126 of suitable size and strength necessary for latching the tongue in a forward end depressed manner for cart-type operation. Latch lug 126 is receivable in the forward facing opening 64 of the turning block arcuate surface 62.

Pin 124 is movable between a latching condition and an unlatched condition by means of an over-center slide linkage assembly 130 comprising a handle member 132 pivoted on a pivot shaft 134 extending between the outside frame members 120 as shown in FIG. 3. One end of handle member 132 is provided with a pin 136 which has a pair of draw plates 128 and 140 connected thereto as shown in FIG. 3. A transverse draw plate 142 is welded to the other ends of plates 138 and 140 and is provided with an aperture which embraces pin 124.

FIG. 4 illustrates latch lug 126 in a latching condition inserted in the opening 64 of the turning block. In this condition, handle member 132 is biased in a counter-clockwise direction against a handle stop plate 144 by a floating spring connection 133. However, to unlatch latch lug 126, handle 132 is rotated in a clockwise direction to assume the position illustrated in FIG. 6. In this position, pin 134 is positioned in a slot 150 and remains in this position due to the biasing of the floating spring means connecting pin 124 to plates 138, 140 and pin 136. Positioning of the elements in the positions illustrated in FIG. 6 enables the tongue 34 to pivot upwardly and downwardly about axis 66 in an obvious manner as illustrated by the arrows in FIG. 6.

One important aspect of this invention resides in the use of the floating spring couplings for connecting each of the latch pins to their respective actuator means. These couplings enable movement of the actuator handle 132, for example, to the position illustrated in FIG. 6 without actually moving the latch lug 126 out of latching engagement with opening 64 due to the frictional engagement of the latch lug with the opening 64 as would occur, for example, in cases wherein the vehicle is being used as a cart and the tongue is supporting the forward end of the vehicle. However, uncoupling of the vehicle from the towing device and a subsequent lowering of the tongue would release the pressure on the latch lug so that the biasing action of the spring coupling would then move the latch lug out of the confines of opening 64. Similarly, movement of handle 132 to the pin inserting position illustrated in FIG. 3 would not actually result in insertion of the pin until such should be aligned with opening 64. In a like manner, handle 90 can be moved to the position illustrated in FIG. 4 at any desired time without pin 82 actually being inserted in opening 29 of frame member 28. However, the pin will subsequently be inserted at any subsequent time when the pin is aligned with opening 29. Moreover, movement of handle 90 to the position illustrated in FIG. 6 will not result in withdrawal of the pin 82 from opening 29 unless and until there is no frictional engagement with the inside of opening 29 and the inserted portion of pin 82.

Another aspect of this invention resides in the fact that engagement of pillow block 68 with the lower end of arcuate portion 28 provides structural resistance to the upward urgings of turning block 58 as would obviously occur when the device should be used in a cart mode type of operation. These and other features of the invention provide a uniquely simple, reliable and sturdy vehicle of modest cost and great efficiency, and while others skilled in the art will conceive of obvious mechanical variations, it should be understood that this invention is limited solely by the appended claims.

What I claim is:

1. A land vehicle convertible from a four wheeled wagon type mode of operation in which four wheels are in ground engagement to a two wheeled cart type mode of operation in which only two rear wheels engage the ground with the front end of the vehicle being supported by the tow bar assembly of a tractor or other towing means, said vehicle comprising a unitary frame member, a rear wheel assembly affixed adjacent the rearmost portion of said frame member, a pair of front wheels steerably connected to said frame member adjacent the front end of said frame member, a vertical pivot bearing located on the longitudinal axis of said frame member adjacent the forward end of said frame member, a turning block pivotally connected for pivotal movement about said vertical bearing, an arcuate portion of said frame located immediately above the path of pivotal travel of said turning block, a latching opening in said arcuate portion of said frame, steering linkage means connecting said front wheels to said turning block for providing a turning movement of said front wheels in response to pivotal movement of said turning block about said vertical bearing, tongue means having means adjacent its forward end for enabling connection to a towing means and being pivotally connected adjacent its rearmost end to said turning block for pivotal movement about a horizontal axis, tongue latching means for latching the forward end of said tongue in a depressed position to prevent subsequent pivotal movement of said tongue with respect to said horizontal axis so that subsequent lifting movement of the forward end of said tongue will lift the front wheels from the ground, turning block latching means including a turning block latch pin supported for reciprocation in fixed guide means extending upwardly from said turning block for insertion in said latching opening for latching said turning block in a fixed longitudinally aligned position with respect to the longitudinal axis of said frame so as to enable a cart type turning of the entire vehicle in response to turning movement of the tongue to enable a cart mode of operation when both of said latching means are in latched condition and a floating spring connection means connecting said turning block latch pin to an over-center linkage means for biasing said latch pin away from said arcuate portion of said frame when said linkage means is moved to a first position and for biasing said pin toward said arcuate portion when said linkage is moved to a second position.

2. The invention of claim 1 wherein said tongue-latching means comprises an axially reciprocable tongue latching pin reciprocable into an opening in said turning block for receiving said tongue latching pin when said tongue latching pin is in alignment with said opening so as to latch said tongue in its latched position.

3. The invention of claim 2 wherein said tongue latching pin is connected through a floating spring means connected to a over-center slide linkage for biasing said tongue latching pin toward said opening in said turning block when said over-center linkage means for moving said slide linkage is in a first position and for biasing said tongue latching pin away from said opening in said turning block when said over-center slide linkage is in a second position.

4. The invention of claim 1 wherein said arcuate portion of said frame has a center of curvature coincident with the pivot axis of said pivot bearing so that movement of said over-center linkage means associated with said turning block latch pin to said over-center linkage means' second position allows said turning block latch pin to be biassed against said arcuate portion of said frame member by said floating spring connection means until such a time as said tongue assumes a position aligned with the axis of said frame so as to enable said pin to then be inserted into said opening in said arcuate portion of said frame member.

5. The invention of claim 4 wherein said tongue-latching means comprises an axially reciprocable tongue latching pin reciprocable into an opening in said turning block for receiving said tongue latching pin when said tongue latching pin is in alignment with said opening so as to latch said tongue in its latched position.

6. The invention of claim 5 wherein said tongue latching pin is connected through a floating spring means connected to an over-center slide linkage for biasing said tongue latching pin toward said opening in said turning block when said over-center linkage means for moving said slide linkage is in a first position and for biasing said tongue latching pin away from said opening in said turning block when said over-center slide linkage is in a second position.

7. The invention of claim 6 wherein said tongue means comprises first and second laterally spaced outside frame members defining an interior space in which said tongue latching pin member is supported for reciprocation on a transversely extending frame member extending across said space between said first and second outside frame members.

References Cited

UNITED STATES PATENTS

| | | | |
|---|---|---|---|
| 1,385,361 | 7/1921 | Clement | 280—445 |
| 1,446,756 | 2/1923 | Lee | 280—103 |
| 1,908,987 | 5/1933 | Kuhlman | 280—425 |
| 2,564,311 | 8/1951 | Rimailho | 280—418 X |
| 3,163,306 | 12/1964 | Bennett et al. | 280—425 X |
| 2,266,913 | 12/1941 | Simmons | 280—405 |

FOREIGN PATENTS

| | | |
|---|---|---|
| 217,030 | 1/1958 | Australia. |
| 926,224 | 4/1955 | Germany. |

LEO FRIAGLIA, Primary Examiner

U.S. Cl. X.R.

280—415, 445